Nov. 16, 1926.  
E. G. BENTLEY  
1,607,505
ROTARY INTERNAL COMBUSTION ENGINE
Filed March 7, 1924     4 Sheets-Sheet 1
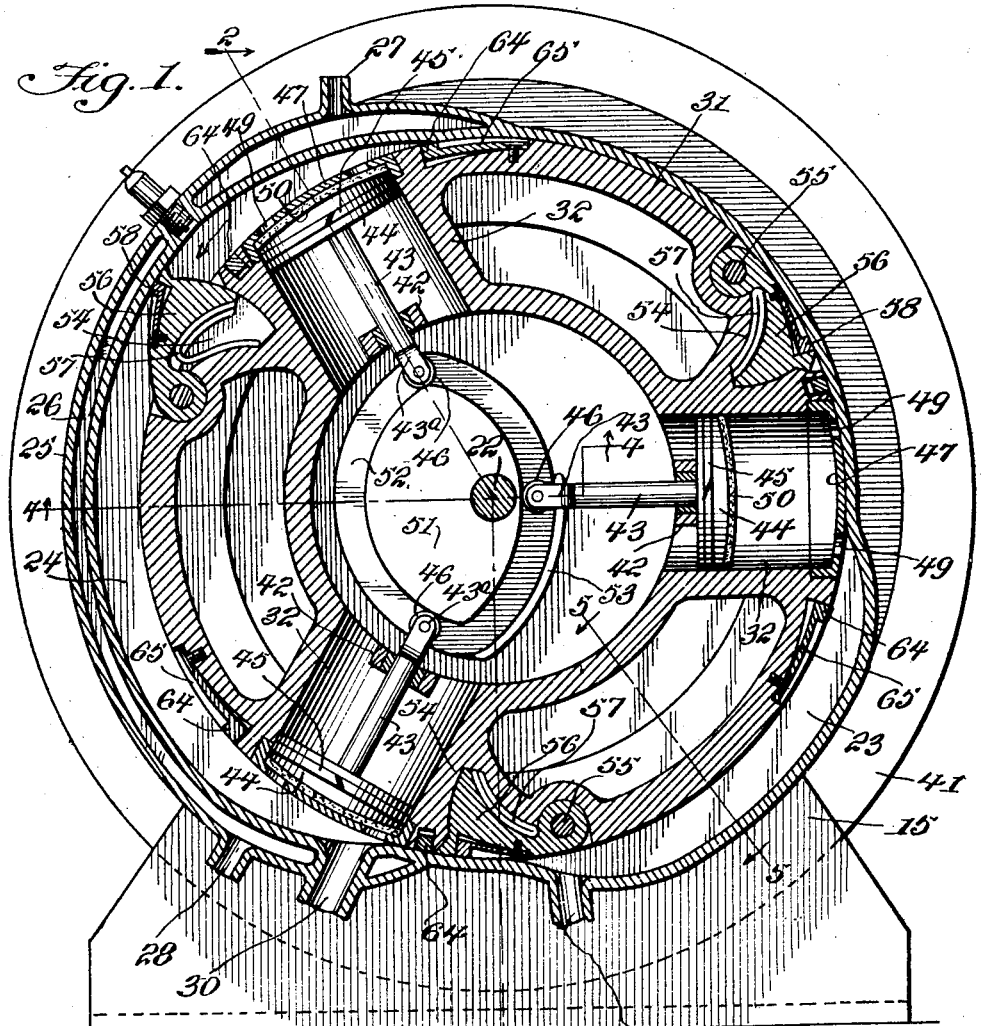
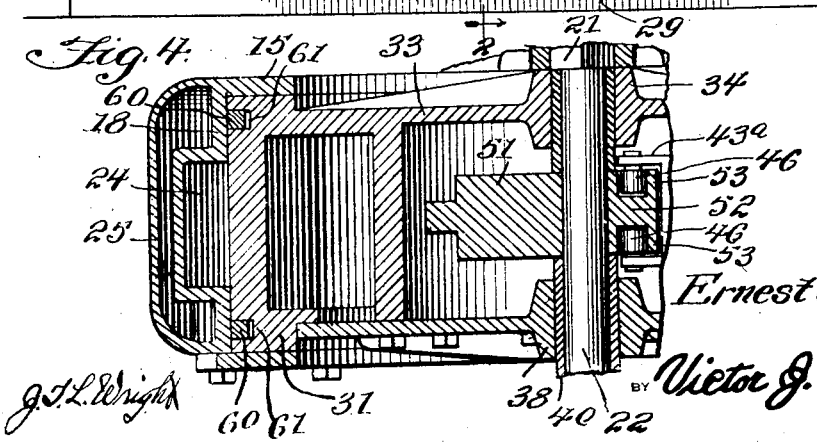
Ernest G. Bentley  
INVENTOR
BY Victor J. Evans  
ATTORNEY
WITNESS: J. L. Wright

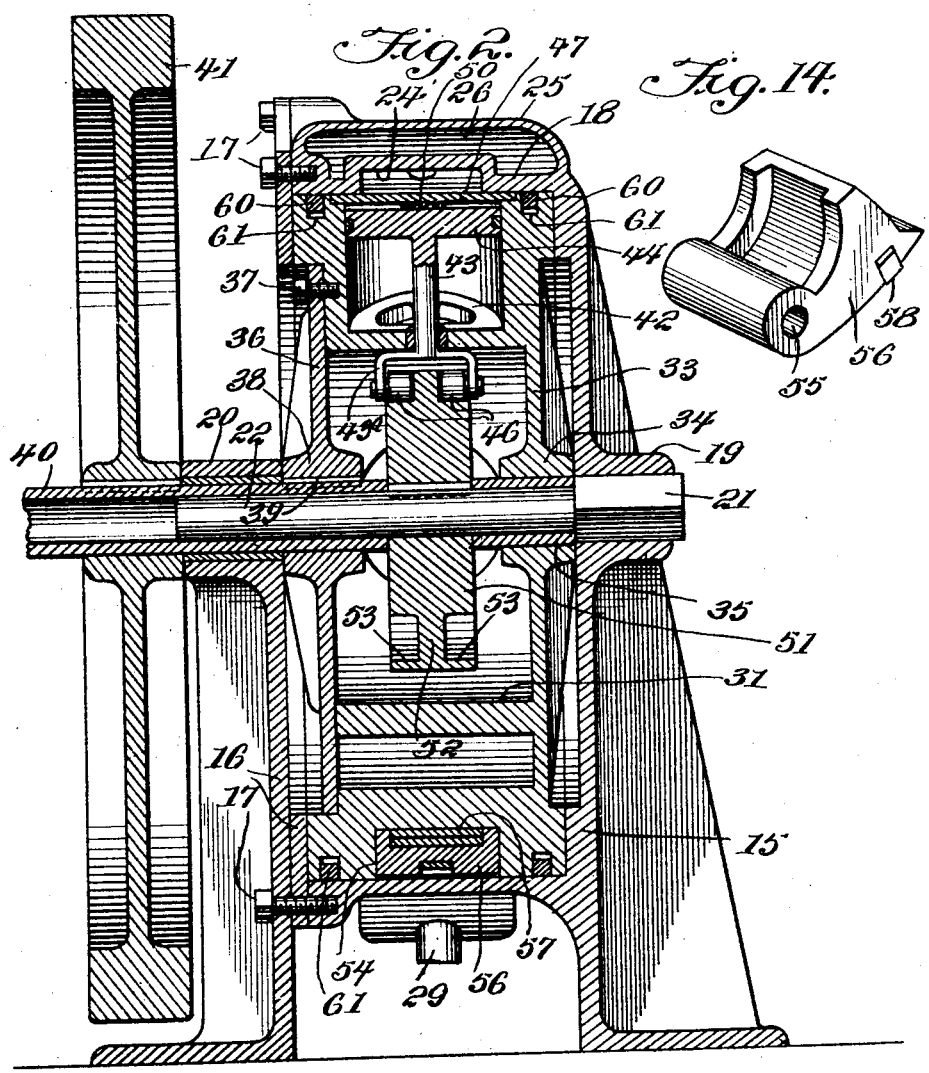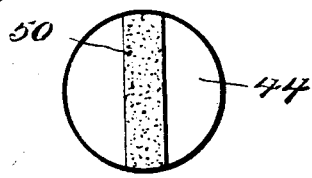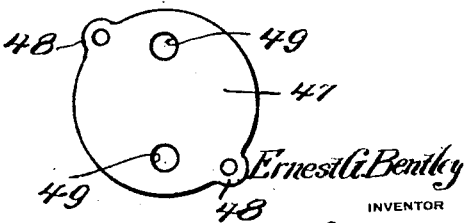

Nov. 16, 1926.
E. G. BENTLEY
1,607,505
ROTARY INTERNAL COMBUSTION ENGINE
Filed March 7, 1924   4 Sheets-Sheet 3
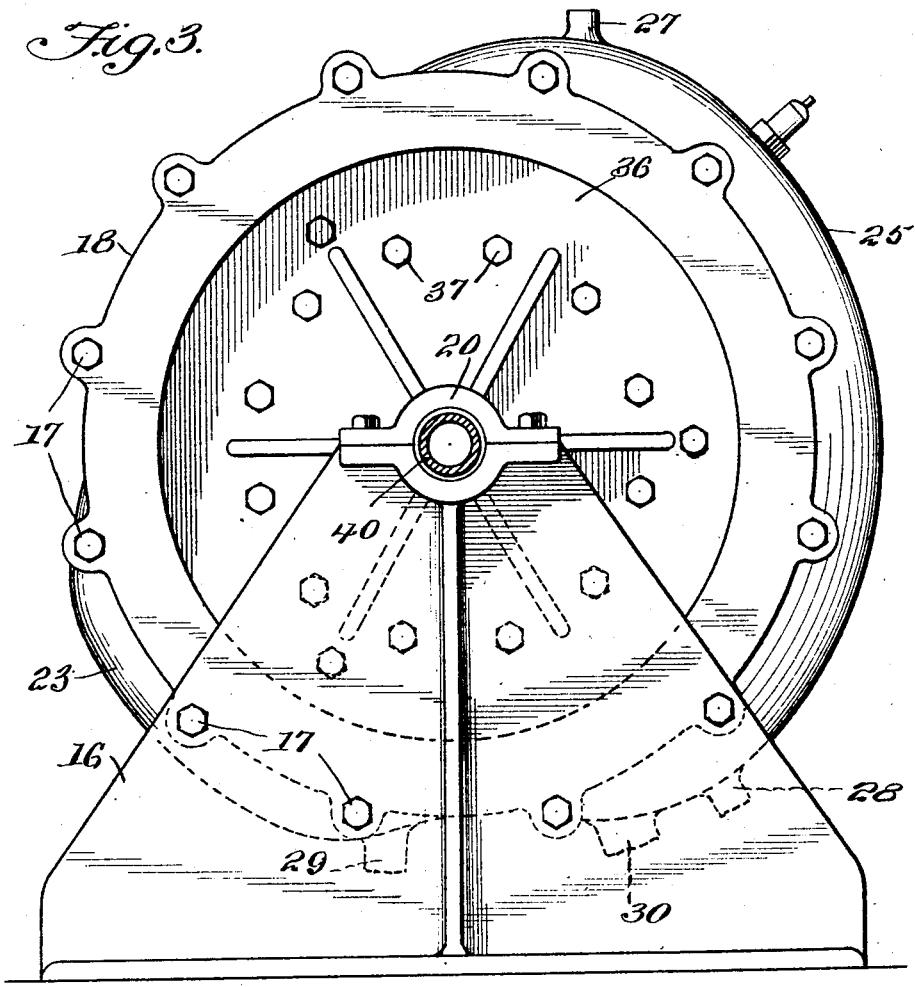
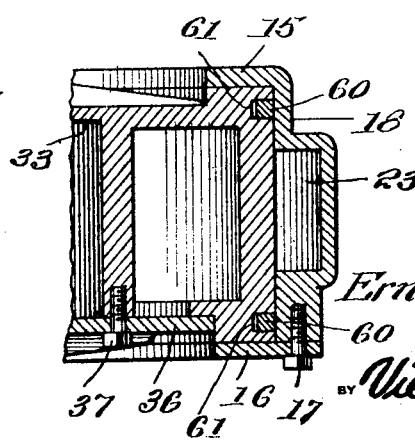

Nov. 16, 1926.
E. G. BENTLEY
1,607,505
ROTARY INTERNAL COMBUSTION ENGINE
Filed March 7, 1924    4 Sheets-Sheet 4
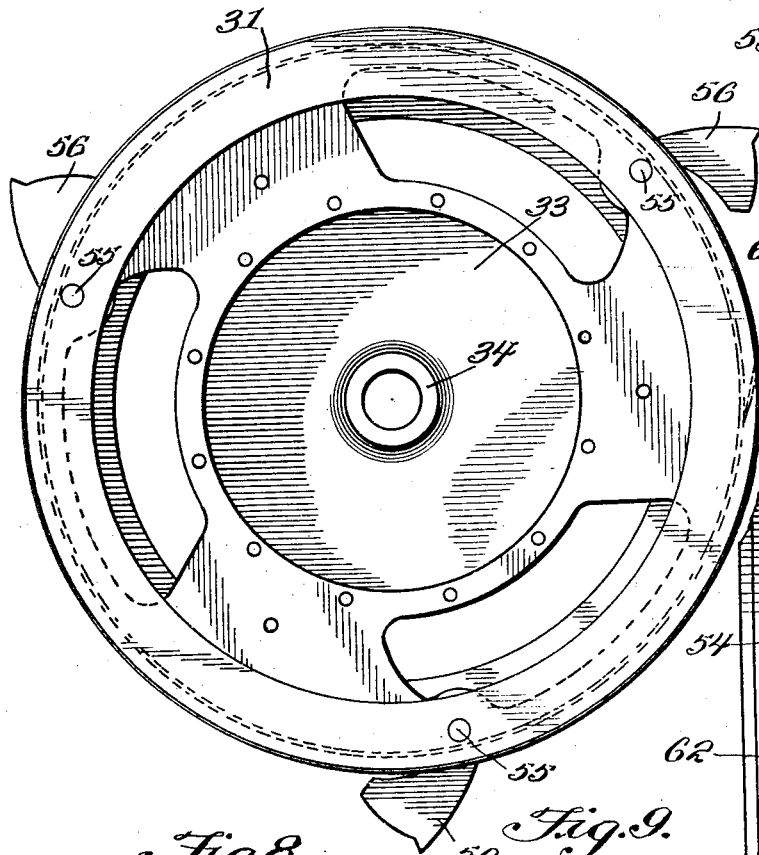
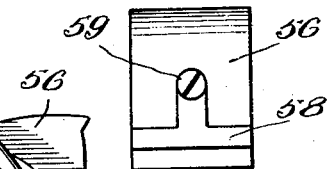
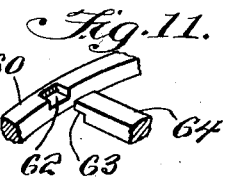
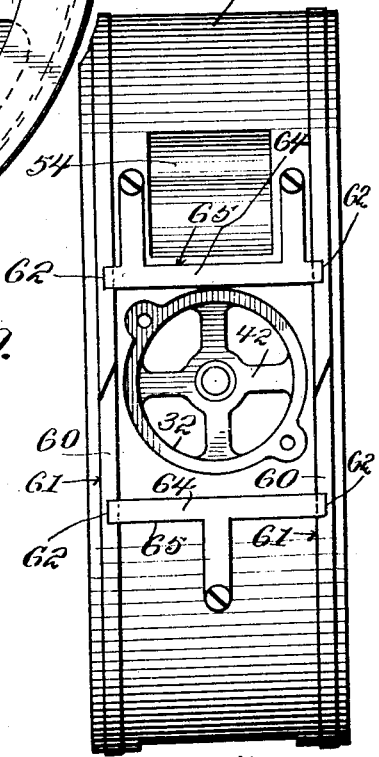
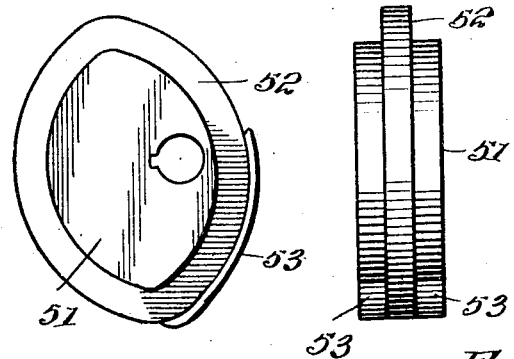
Ernest G. Bentley INVENTOR
BY Victor J. Evans
ATTORNEY
WITNESS:

Patented Nov. 16, 1926.

1,607,505

UNITED STATES PATENT OFFICE.

ERNEST G. BENTLEY, OF BROOKLYN, NEW YORK.

ROTARY INTERNAL-COMBUSTION ENGINE.

Application filed March 7, 1924. Serial No. 697,647.

This invention relates to engines, particularly those of the internal combustion type, and has for its object the provision of a novel rotary engine embodying various advantageous features of construction and arrangement whereby to obtain maximum power output with minimum fuel consumption, and to attain ease and smoothness in running.

An important and more specific object is the provision of an engine of this character having cam means for operating a plurality of pistons which act to draw in and compress the explosive charge, the pistons and cylinders therefor being used in conjunction with automatically acting movable abutments.

Yet another object is the provision of an engine in which the explosion and exhaust portions are fully water jacketed to maintain a comparatively low temperature even at high speeds.

A further object is the provision of novel means for packing the rotor and other movable parts whereby to prevent leakage of fuel or loss of compression.

An additional object is the provision of an engine which will be simple and inexpensive in manufacture, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a central longitudinal section through the complete engine,

Figure 2 is a section on the line 2—2 of Figure 1,

Figure 3 is a side elevation,

Figure 4 is a section on the line 4—4 of Figure 1,

Figure 5 is a detail section on the line 5—5 of Figure 1,

Figure 6 is a side elevation of the rotor,

Figure 7 is an edge view thereof,

Figure 8 is a detail elevation of the actuating cam,

Figure 9 is a side view thereof,

Figure 10 is a detail view of one of the abutment members showing the packing means thereon, Figure 11 is a detail perspective view showing fragments of the packing rings for the rotor and illustrating their interconnection, Figure 12 is an end view of one of the pistons, Figure 13 is a detail view of the apertured plate therefor, Figure 14 is a perspective view of one of the abutments.

Referring more particularly to the drawings I have shown the engine as comprising a stationary frame which includes two sections 15 and 16 and which are detachably connected by bolts 17 or the like. The section 15 is formed with a cylindrical casing 18 which constitutes the stator. The sections 15 and 16 are formed respectively with bearings 19 and 20, within the former of which is secured the squared end 21 of a shaft 22 which is thus held stationary.

At substantially opposite points, the periphery of the stator is enlarged outwardly to define intake and exhaust compartments 23 and 24 respectively, and the latter is surrounded by a spaced wall 25 defining a water jacket 26 which has the usual or any preferred inlet and outlet connections 27 and 28. The intake compartment 23 is not jacketed as such is unnecessary for the reason that no great amount of heat is developed at this side of the stator. Naturally the intake and exhaust compartments have intake and exhaust pipes 29 and 30 respectively connected therewith for the purpose of supplying fuel mixture to the former and exhausting burnt gases from the latter.

Operating within the stator is the rotor designated broadly by the numeral 31, which rotor is cylindrical in shape and formed to provide a plurality of cylinders 32 which are radially arranged. At one side the rotor is formed with a web 33 at the center of which is a bearing hub 34 engaged rotatably upon a sleeve 35 surrounding the shaft 22. The other side of the rotor includes a plate 36 which is similar in size and shape to the web 33 but which is detachable so that access may be had to the interior of the rotor. This removable plate is held in place by suitable studs 37 and it is formed centrally with a hub 38 keyed or otherwise positively secured, as shown at 39, upon a hollow shaft 40 which surrounds the stationary shaft 22.

Also secured on this hollow shaft is an ordinary fly wheel 41 and it is quite obvious that a pulley, gear or other power take off mechanism may also be mounted upon this hollow shaft.

Within the inner end of each cylinder 32 is a spider 42 forming a guide for a piston rod 43 carrying a piston 44 equipped with the usual or any preferred packing rings 45. The inner ends of all the piston rods have journaled therein rollers 46 for a purpose to be described. Screwed into the outer end of each cylinder is a closure plate 47 having ears 48 for effecting positive securing so that casual unscrewing will be prevented. Each closure plate is formed with two or more openings 49 for effecting communication between the cylinders and the explosion or exhaust compartment and the intake compartment as the case may be. As the outer end of each piston is an elongated strip 50 adapted to seat against the plate 47 for closing and sealing the holes 49 therein.

The operating means for the pistons comprises an elliptical cam 51 which is keyed or otherwise rigidly secured to the stationary shaft 22 and this cam has its outer periphery formed with a web 52 at opposite sides of which the rollers 46 travel. It is to be observed that the rollers 46 above referred to are mounted within forks 43ª at the inner ends of the piston rods. At a point toward the intake compartment 23, this web 52 of the cam is formed with outwardly extending flanges 53 which engage over the rollers for the purpose of retracting the pistons as they approach this point.

Adjacent the cylinders 32, the rotor is formed with pockets 54 within which are pivoted, at 55, abutments 56 which bear always against the inner periphery of the stator and which are urged outwardly by V-shaped springs 57 located within the pockets. To prevent leakage of compression between the abutments and the inner periphery of the stator, I provide T-shaped resilient packing members 58 mounted within correspondingly shaped recesses in the outermost portion of the abutments, these elements being held by screws 59 which pass through the short arms.

To prevent leakage at other points, I provide annular sectional spring rings 60 seated within corresponding grooves or recesses 61 in the outer periphery of the rotor at the sides of the cylinders. These annular rings are formed with recesses 62 within which are engaged the partially cut away ends 63 of other packing strips 64 which are located within transverse grooves 65 in the outer periphery of the rotor at points adjacent the cylinders.

In the operation, it will be seen that the rotor must travel in a counter clockwise direction that is when looking at Figure 1. The cam and casing structure are both stationary so that when the rotor turns and each cylinder approaches the intake compartment 23, the abutment in advance of the cylinder will swing out into engagement with the outer wall of the intake compartment, and the rollers at the inner end of the piston rod will engage beneath the flanges 53 of the cam. As the turning movement of the rotor continues, it is obvious that the piston will be drawn inwardly toward the center, the piston consequently operating to suck in a charge of mixture from the compartment 23, the mixture entering the cylinder through the holes 49. The piston remains in this position until the rotor has traveled to a point where the cylinder extends horizontally, and from this point to the point where the rollers 46 will engage the uppermost point of the cam 51, the piston is forced outwardly, compressing the charge in advance thereof. When the rotor turns further and the cylinder reaches the compartment 24, the compressed gas passes out through the holes 49 into the compartment 24. After leaving the intake compartment, the abutment is forced back into its pocket 54 but upon reaching the compartment 24, the abutment again swings outwardly. The compressed charge escaping into the compartment 24 as above described, is ignited therein by means of the usual spark plug P, and when the explosion occurs the force thereof is applied to the end of the abutment, naturally forcing the rotor around. As the rotor moves on this power stroke, the abutment passes down along the wall of the compartment 24 until it passes over the exhaust port 30, whereupon the exploded charge or burnt gases behind the abutment will escape. This cycle of operations is the same of course for all cylinders and will continue as long as fuel and igniting means are applied. It should be mentioned in passing that the purpose of the sealing strip 50 is to close the holes 49 so that when the explosion occurs there will be not passage of gases back into the cylinder.

The engine also includes a novel lubricating feature. The chamber within which the cam operates may be considered and used as an oil reservoir fed from any suitable source by any desired means. Quite naturally the movement of the parts wil cause considerable splashing of the oil so that a great many of the wearing surfaces will be efficiently lubricated. However there are certain other surfaces which are more or less incapable of being lubricated by the splash system and I may therefore provide any desired number of grooves of suitable size and shape leading to these inaccessible surfaces for the purpose of conducting the oil thereto.

After starting the engine, it is possible to run it without any ignitor such as a spark plug. When the explosion drives the rotor down, the following combustion chamber is formed before the piston driven by the explosion passes the exhaust port and the explosion will not be fully expanded but will press down and pass over the following piston into the combustion chamber, igniting the compressed charge. The explosion takes place in the same manner and the engine runs as it would with the spark advanced.

If preferred, an exhaust cut out, not shown, might be placed above the exhaust outlet far enough to permit the burnt charge to be expelled when the combustion chamber is forming. Such a cut out would be used for slow running of the engine with the spark retarded.

From the foregoing description and a study of the drawings it will be apparent that I have thus provided a simply constructed and very efficient internal combustion engine embodying not only a rotor but also piston means for compressing the proper explosive charge so that the advantages of different types of engines will be attained.

While I have shown and described the preferred embodiment of my invention it is of course to be understood that I reserve the right to make such changes in the form, construction and arrangement of parts as will not depart from the spirit of the invention or the scope of the subjoined claim.

I claim:

In an engine of the character described, a stator having a portion of its inner periphery of cylindrical form and having the remainder likewise of cylindrical form but of greater diameter, the portions of larger diameter merging into those of the smaller diameter by volute wall portions whereby to define inlet and exhaust chambers, a shaft located centrally of the stator, a cam of substantially elliptical form stationarily mounted on said shaft, a rotor mounted on the shaft and formed with a plurality of cylinders provided with apertures at their outer ends for communication with said chambers, a guide at the inner end of each cylinder, a piston slidable within each cylinder and having a rod slidable through the guide and carrying a roller for coaction with said cam, said cam being provided at one side with a flange engaged by the rollers, and outwardly spring pressed pivoted abutments carried by the rotor and cooperating with the outer walls of said chambers.

In testimony whereof I affix my signature.

ERNEST G. BENTLEY.